(12) United States Patent
Ho et al.

(10) Patent No.: US 8,956,522 B2
(45) Date of Patent: Feb. 17, 2015

(54) TIN/LITHIUM OXIDE COMPOSITE THIN FILM, ITS PREPARATION AND USES THEREOF

(75) Inventors: Wen-Hsien Ho, Keelung (TW); Shiow-Kang Yen, Taichung (TW); Ching-Fei Li, Chiayi County (TW)

(73) Assignee: Taiwan Textile Research Institute, Tu-Chen, Taipei Hsien (TW)

( * ) Notice: Subject to any disclaimer, the term of this patent is extended or adjusted under 35 U.S.C. 154(b) by 1323 days.

(21) Appl. No.: 12/470,665

(22) Filed: May 22, 2009

(65) Prior Publication Data

US 2010/0167128 A1    Jul. 1, 2010

(30) Foreign Application Priority Data

Dec. 29, 2008   (TW) ................. 97151278 A

(51) Int. Cl.
| | |
|---|---|
| *H01M 4/29* | (2006.01) |
| *H01M 4/48* | (2010.01) |
| *H01M 4/1391* | (2010.01) |
| *C01G 19/00* | (2006.01) |
| *H01M 4/04* | (2006.01) |
| *H01M 4/66* | (2006.01) |
| *H01M 4/485* | (2010.01) |

(Continued)

(52) U.S. Cl.
CPC ............ *H01M 4/1391* (2013.01); *C01G 19/00* (2013.01); *H01M 4/0438* (2013.01); *H01M 4/0452* (2013.01); *H01M 4/66* (2013.01); *C01P 2002/72* (2013.01); *C01P 2002/85* (2013.01); *C01P 2004/03* (2013.01); *C01P 2006/40* (2013.01); *H01M 4/485* (2013.01); *H01M 10/052* (2013.01); *H01M 2004/028* (2013.01); *Y02E 60/122* (2013.01)
USPC .................... 205/59; 205/50; 429/231.95

(58) Field of Classification Search
CPC ............................. C01G 19/06; C01G 19/08
USPC ................... 429/231.95; 205/50, 59
See application file for complete search history.

(56) References Cited

U.S. PATENT DOCUMENTS

| | | | |
|---|---|---|---|
| 6,503,382 B1 * | 1/2003 | Bartlett et al. | 205/67 |
| 2005/0143715 A1 * | 6/2005 | Cima et al. | 604/890.1 |

(Continued)

FOREIGN PATENT DOCUMENTS

KR    2001086974 A * 9/2001 .............. H01M 4/02

OTHER PUBLICATIONS

Nam et al., "Enhancement of thin film tin oxide negative electrodes for lithium batteries," 2001, Electrochemistry Communications, 3, pp. 6-10.*

(Continued)

*Primary Examiner* — Jun Li
(74) *Attorney, Agent, or Firm* — McClure, Qualey & Rodack, LLP

(57) ABSTRACT

A method for electrochemically producing a tin/lithium oxide composite thin film includes providing a solution comprising $10^{-3}$ to $10^{-2}$ M lithium nitrate and $10^{-4}$ to $10^{-3}$ M stannic chloride or stannous chloride; electrodepositing the tin/lithium oxide composite thin film on a conductive substrate with a reference electrode of Ag/AgCl and a voltage of 900 to 1500 mV; and drying the tin/lithium oxide composite thin film at a temperature of 15 to 40° C. and a relative humidity of at least 75%.

13 Claims, 4 Drawing Sheets

(51) Int. Cl.
*H01M 10/052* (2010.01)
*H01M 4/02* (2006.01)

(56) References Cited

U.S. PATENT DOCUMENTS

2009/0214956 A1* 8/2009 Prieto et al. .................. 429/310
2010/0134954 A1* 6/2010 Wright et al. ................. 361/502

OTHER PUBLICATIONS

Yu et al., "ATin-Based Amorphous Oxide Composite with a Porous, Spherical, Multideck-Cage Morphology as a Highly Reversible Anode Material for Lithium-Ion Batteries," 2007, Advanced Materials, 19, pp. 993-997.*

Lee et al., "Characteristics of Sn/Li2O multilayer composite anode for thin film microbattery," 2008, Journal of Power Sources, 178, pp. 434-438.*

Kim et al., "Indium tin oxide thin films grown on flexible plastic substrates by pulsed-laser deposition for organic light-emitting diodes," 2001, Applied Physics Letters, vol. 79, No. 3, pp. 284-286.*

Li et al, Electrolytic Sn/Li2O coatings for thin-film lithium ion battery anodes, Journal of Power Sources, 196, 2011: 768-775.*

Machine translation of KR2001086974 A, pubdate, Sep. 2001.*

* cited by examiner

US 8,956,522 B2

TIN/LITHIUM OXIDE COMPOSITE THIN FILM, ITS PREPARATION AND USES THEREOF

RELATED APPLICATIONS

This application claims priority to Taiwan Application Serial Number 97151278, filed Dec. 29, 2008, which is herein incorporated by reference.

BACKGROUND

1. Field of Invention

The present invention relates to tin/lithium oxide composite thin films and methods for manufacturing the same. More particularly, the present invention relates to electrochemical methods for manufacturing tin/lithium oxide composite thin films.

2. Description of Related Art

Lithium ion secondary battery has been widely used in consumer electronics and high power electronics due to its light weight, high electromotive force, and high energy density. Lithium ion secondary battery is classified into high power lithium battery, high capacity lithium battery, and thin film lithium battery. The thin film lithium battery is thin, flexible, and printable and thus is used as a flexible driving power source for IC card, flexible electronic devices and medical electronics.

Metallic lithium was initially used as the cathode material of the lithium ion secondary battery; however, branched structures would form on the surface of the metallic lithium after a number of charge-discharge cycles and thereby would imperil the life cycle and safety of the battery. Lithium cells commonly used in consumer applications have used graphite as the cathode material; however, the graphite cathode has an unsatisfactory low theoretical capacity of about 372 mAh/g. Hence, materials suitable for use as a cathode material have been investigated so as to provide batteries with better capacity and life cycle.

More recently, tin-containing materials have been proposed to be cathode material of the lithium ion secondary battery. If tin dioxide was used as the cathode material, tin dioxide would irreversibly form lithium oxide during the first charge-discharge cycle and thus result in a large irreversible capacity. If tin metal was used as the cathode material, tin would reversibly alloy with lithium and hence would not cause the irreversible capacity loss. However, in the latter case, the relative large of volumetric change would imperil the life cycle of the battery. Therefore, cathodes containing tin or tin oxide are limited to academic research and not applied in commercial products.

In view of the foregoing, there is a need in the related field to provide a cathode material of lithium secondary battery, which has desirable charge-discharge life cycles, and a simplified and cost-effective method for manufacturing the same.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present concepts disclosed herein in a simplified form as a prelude to the more detailed description that is presented later.

In one aspect, the present invention is directed to an electrochemical method for manufacturing tin/lithium oxide composite thin films. As compare with physical sputtering, said electrochemical method is much simpler and deposition is accomplished within a much shorter time frame According to one embodiment of the present invention, the electrochemical method for manufacturing tin/lithium oxide composite thin films includes the procedures of providing a solution for electrodeposition; electrodepositing the tin/lithium oxide composite thin film on a conductive substrate under a suitable condition; and drying the tin/lithium oxide composite thin film at a drying temperature of about 15-40° C. and a relative humidity of at least about 75%. In one example, said solution comprises about $10^{-3}$ M to about $10^{-2}$ M lithium nitrate and about $10^{-4}$ M to about $10^{-3}$ M stannic chloride or stannous chloride; and said suitable condition may include using Ag/AgCl as a reference electrode and a voltage of about 900-1500 mV.

In another aspect, the present invention is directed to a tin/lithium oxide composite thin film. According to one embodiment of the present invention, the tin/lithium oxide composite thin film comprises a plurality of tin/lithium oxide composite particles, wherein each tin/lithium oxide composite particle comprises a plurality of tin crystal grains and a lithium oxide thin layer enveloping the tin crystal grains.

In a further aspect, the present invention is directed to a cathode component of a secondary lithium battery, wherein said tin/lithium oxide composite thin films of the embodiments of the present invention is used to manufacture the cathode component. According to one embodiment of the present invention, the cathode component of the secondary lithium battery comprises a conductive substrate and a tin/lithium oxide composite thin film, wherein the tin/lithium oxide composite thin film is disposed on a conductive surface of the conductive substrate.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein.

DETAILED DESCRIPTION

Figure 1A:
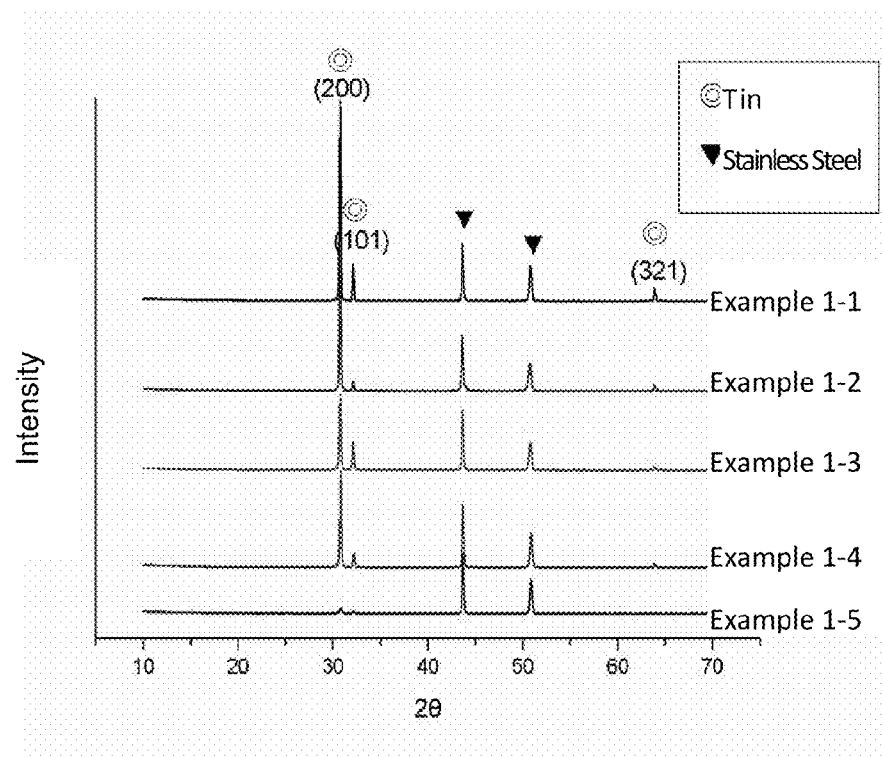
FIG. 1A is a photograph showing X-ray diffraction patterns of tin/lithium oxide composite thin films of various examples of the present invention.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Embodiments of electrochemical methods for manufacturing tin/lithium oxide composite thin films are illustrated and the tin/lithium oxide composite thin films thus-prepared are used as cathode component of a secondary lithium battery. The results of cyclic voltammetry analysis of the secondary lithium battery are also presented.

(I) Manufacturing Tin/Lithium Oxide Composite Thin Film by Electrochemical deposition In one aspect, the present invention is directed to an electrochemical method for manufacturing tin/lithium oxide composite thin films.

According to one embodiment of the present invention, the electrochemical method for manufacturing tin/lithium oxide composite thin films includes the procedures of providing a solution for electrodeposition; electrodepositing the tin/lithium oxide composite thin film on a conductive substrate under a suitable condition; and drying the tin/lithium oxide composite thin film.

Specifically, a solution was prepared by mixing thoroughly about lithium nitrate and stannic chloride or stannous chloride in a tank or other suitable container. More specifically, the molar concentration of the lithium nitrate can be about $10^{-3}$ M, $2\times10^{-3}$ M, $3\times10^{-3}$ M, $4\times10^{-3}$ M, $5\times10^{-3}$ M, $6\times10^{-3}$ M, $7\times10^{-3}$ M, $8\times10^{-3}$ M, $9\times10^{-3}$ M, or $10^{-2}$ M; while the molar concentration of the stannic chloride or stannous chloride can be about $10^{-4}$ M, $2\times10^{-4}$ M, $3\times10^{-4}$ M, $4\times10^{-4}$ M, $5\times10^{-4}$ M, $6\times10^{-4}$ M, $7\times10^{-4}$ M, $8\times10^{-4}$ M, $9\times10^{-4}$ M, or $10^{-3}$ M.

Next, the conductive substrate to be electrodeposited was immersed in the tank or container containing the solution, and the electrodeposition was carried out at room temperature (about 23-27° C.) under a suitable condition for about 10-100 minutes where a reference electrode of Ag/AgCl and a voltage of about 900-1500 mV were used. Optionally, platinum might be used as a counter electrode. Specifically, the electrodeposition can be carried out for about 10, 20, 30, 40, 50, 60, 70, 80, 90 or 100 minutes. In specific examples, the voltage for electrodeposition can be about 900, 1000, 1100, 1200, 1300, 1400 or 1500 mV. During electrodeposition, the solution can be stirred, and tin ions and lithium ions should be timely supplemented to maintain the required concentration thereof.

In various examples of the present invention, the conductive substrate can be a conductive fabric, a transparent conductive substrate, a flexible substrate, a metal substrate, or a metal oxide substrate. As an example, but not as a limitation, the conductive fabric can be made from conjugated polymers or metallic fibers/yarns; the transparent conductive substrate can be a fluorine-doped tin oxide/glass (FTO/glass) substrate, an indium tin oxide/glass (ITO/glass) substrate, or an ITO/polyethylene naphthalate (ITO/PEN) substrate; the flexible substrate can be a polyethylene terephthalate (PET) substrate or polycarbonate (PC) substrate; and metal substrate can be a platinum substrate or a stainless steel substrate.

The forgoing electrodeposition step of this invention can be carried out by potentiostatic deposition or pulse potential deposition. In examples of the present invention, the electrodeposition was performed by potentiostatic deposition with voltages of about 900, 1000, 1200 and 1500 mV, respectively; while in other examples, the electrodeposition was performed by pulse potential deposition with a pulse potential of about 900-1100 mV.

During electrodeposition, several reactions might take place at the working electrode (i.e., the conductive substrate to be electrodeposited) of the electrodeposition system. For example, tin ions in the solution would be reduced to tin metal at the working electrode. In addition, the hydroxyl ions generated by the electrolysis of water might react with the lithium ions to generate lithium oxides. Consequently, tin metal and lithium oxides are both deposited on the working electrode thereby forming the tin/lithium oxide composite thin film thereon.

After electrodeposition, the tin/lithium oxide composite thin film thus obtained is dried at a temperature of about 15-40° C. and a relative humidity of at least about 75%. In one example, the tin/lithium oxide composite thin film was dried at a constant temperature of about 40° C. and a relative humidity of about 85%.

Optionally, the tin/lithium oxide composite thin film is further subjected to a heat-treatment at about 100-200° C. after the drying step. The heat-treating step can be carried out in several stages. Specifically, the heat-treating step can include a first heating stage, a second heating stage, and a cooling stage. In the first heating stage, the tin/lithium oxide composite thin film is heated from 23-27° C. to about 70-100° C. at a first heating rate of about 2° C. per minute for about 30-180 minutes; in the second heating stage, the tin/lithium oxide composite thin film is further heated to about 100-200° C. at a second heating rate of about 2° C. per minute for about 30-180 minutes; and in the cooling stage, the tin/lithium oxide composite thin film is cooled to about 23-27° C. at a cooling rate of about 2° C. per minute.

As will occur to those skilled in the art, the temperature of heat treatment depend on the conductive substrate used. For example, with respect to mostly plastic substrates, the temperature of heat treatment should not exceed 300° C. and preferably should not exceed 150° C.

(II) Examples for Manufacturing Tin/Lithium Oxide Composite Thin Films

In the following working examples, tin/lithium oxide composite thin films were prepared in accordance with the above-mentioned method. In each specific working example, at least one parameter of the electrodeposition condition is varied and the parameters used and/or altered are listed in relevant tables. All working examples illustrated in this specification use stainless steel as the conductive substrate (i.e., working electrode), though other substrate materials can be used.

In examples 1-1 to 1-5, the electrodeposition was performed by potentiostatic deposition with various deposition voltages, which are showed in Table 1. In Examples 1-1 to 1-5, the solution for electrodeposition included about $10^{-3}$ M $SnCl_2$ and about $10^{-2}$ M $LiNO_3$, and the electrodeposition was performed for about 20 minutes.

TABLE 1

|  | Voltage (mV) |
| --- | --- |
| Example 1-1 | 800 |
| Example 1-2 | 900 |
| Example 1-3 | 1000 |
| Example 1-4 | 1100 |
| Example 1-5 | 1200 |

After the electrodeposition and the drying steps, the thin films thus-obtained were analyzed, so as to confirm the principal components thereof.

The obtained thin films were analyzed by X-ray diffractometer (MO3X-HF Diffraction from Mac Science), and the resultant diffraction patterns were used to identify the composition of the thin films by comparing to diffraction data published by JOINT COMMITTEE ON POWDER DIFFRACTION STANDARDS—INTERNATIONAL CENTRE FOR DIFFRACTION DATA® (JCPDS-ICDD).

FIG. 1A shows X-ray diffraction patterns of tin/lithium oxide composite thin films of Examples 1-1 to 1-5 of the present invention before heat treatment. The result indicated that β-Sn signals existed in the sample in addition to the signals of the stainless steel substrate. Hence, the thin film thus obtained might comprise tin.

The kinetic energy of the photo electrons of the film was analyzed by Electron Spectroscopy for Chemical Analysis (ESCA; Thermo VG-Scientific from Sigma Probe) and the elements and types of chemical bondings on the thin film surface were determined.

In ESCA, the incident beam is a monochromatic X-ray beam. Core electrons are thus emitted from the sample due to photoelectric effect. The kinetic energy of the emitted photo electrons can be measured, and the binding energy of the electron is calculated by subtracting the kinetic energy measured and the work function of the instrument from the energy of the excitation X-ray. The detected kinetic energies of the photo electrons are then converted to binding energies, thereby enabling element identification.

Figure 1B:
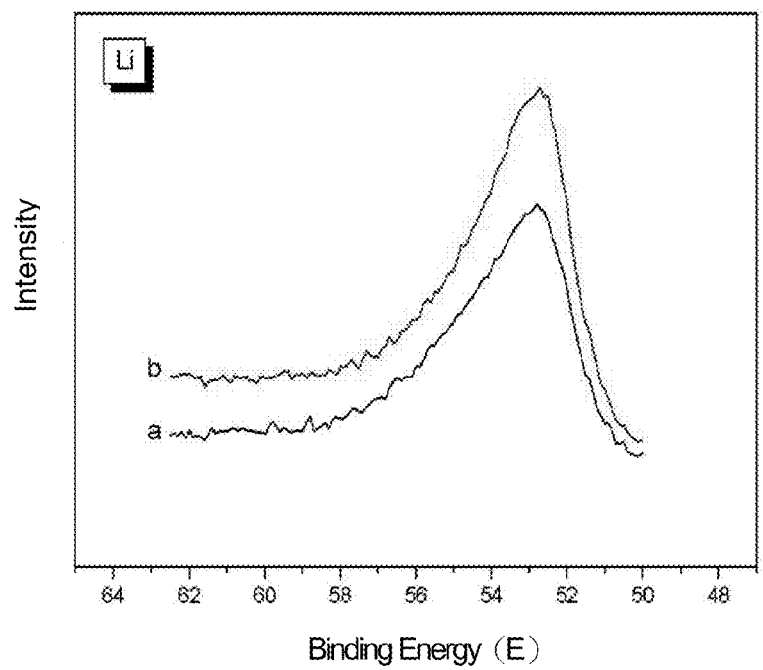
FIG. 1B shows ESCA spetra of a surface of a tin/lithium oxide composite thin film of one example of the present invention before and after the heat treatment.

These photoelectrons were emitted into a vacuum system and their kinetic energy was measured. The spectrum can be plotted on a binding energy scale by subtracting from the energy of the excitation x-ray, FIG. 1B shows ESCA spectra of a surface of a tin/lithium oxide composite thin film of Example 1-4 before (line a) and after the heat treatment (line b). The existence of lithium oxides in the thin film before and after the heat treatment was confirmed by reference to spectra data in Handbook of X-ray Photoelectron. Since lithium oxide signal is absence from FIG. 1A, it is reasonable to conclude that lithium oxides of the thin film exist in amorphous form. From the results of FIG. 1A and FIG. 1B, it is ascertain that the thin film prepared by the method of the present invention is a tin/lithium oxide composite thin film.

Field emission scanning electron microscopy (FE-SEM; JEOL JSM-6700F form Japan) was also used to examine the surface structure of the tin/lithium oxide composite thin films. FIGS. 2A-2F are surface SEM photographs showing tin/lithium oxide composite thin films of various examples of the present invention, in which FIGS. 2A-2E illustrate the surface structures of thin films of Examples 1-1 to 1-5 before the heat treatment, respectively; while FIG. 2F illustrates the surface structure of thin film of Example 1-4 after heat treatment of 200° C.

Figure 2A:
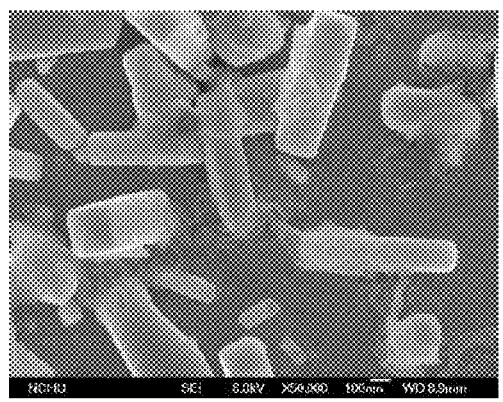
FIGS. 2A-2F are surface SEM photographs showing tin/lithium oxide composite thin films of various examples of the present invention.
Figure 2B:
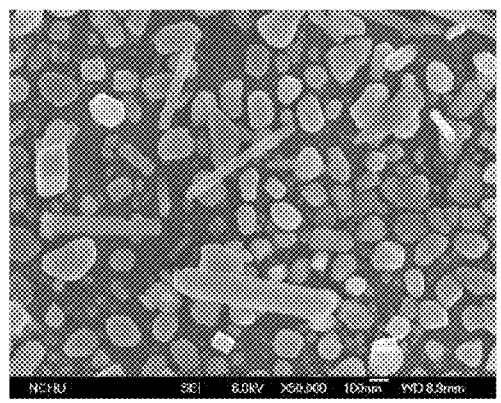
Figure 2C:
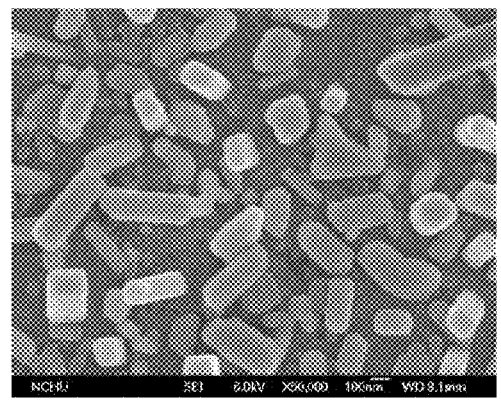

In FIG. 2A, rod-like crystalline particles can be seen on the surface of the tin/lithium oxide composite thin film of Example 1-1; and these particles are sparsely distributed across the sample surface. By comparing the surface structures respectively shown in FIGS. 2A-2E, it is clear that the density of particle distribution increases with an increase in electrodeposition voltage, while the particle size decreases at the same time.

Figure 2D:
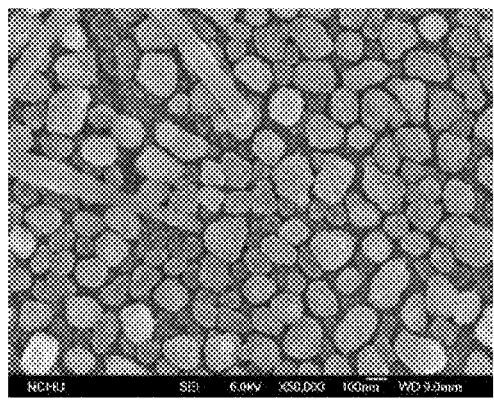
Figure 2E:
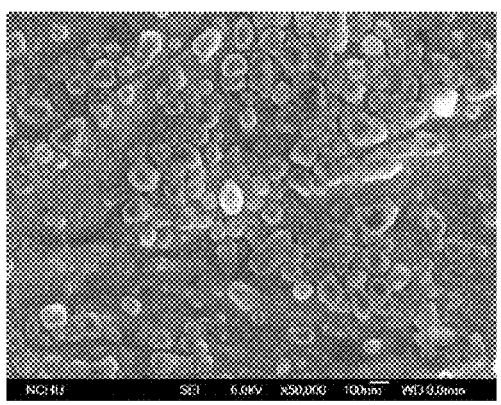
Figure 2F:
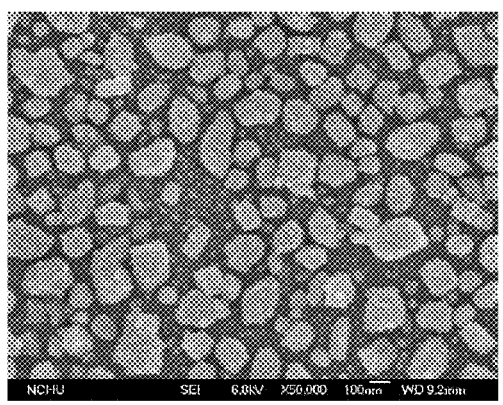

FIG. 2D and FIG. 2F illustrate the surface structures of the tin/lithium oxide composite thin film of Example 1-4 before and after the heat treatment, respectively. As can be seen in FIG. 2D and FIG. 2F, the particles tend to aggregate and increase in size in response to the heat treatment.

Figure 3:
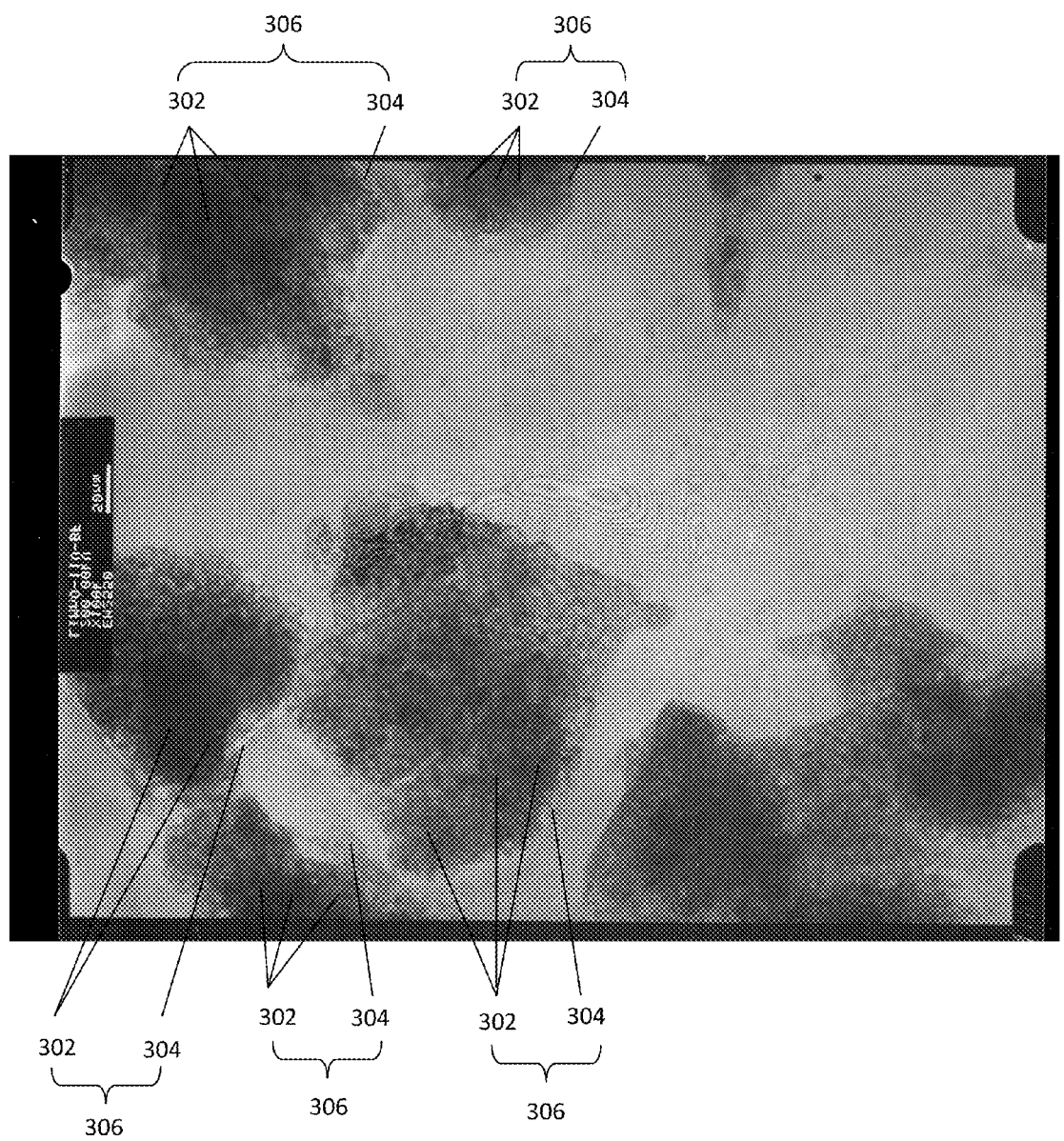
FIG. 3 is a TEM photograph showing a tin/lithium oxide composite thin film of one example of the present invention.

Transmission electron microscopy (TEM) photos further show that a thin layer of lithium oxide 304 develops and wraps around a plurality of tin crystal grains 302 and thereby forming a tin/lithium oxide composite particle 306 (FIG. 3). Thus, the tin/lithium oxide composite thin film prepared in accordance with the present invention may comprise multiple tin/lithium oxide composite particles 306.

Hence, in another aspect, the present invention is directed to a tin/lithium oxide composite thin film. According to embodiments of the present invention, the tin/lithium oxide composite thin film comprises a plurality of tin/lithium oxide composite particles, wherein each tin/lithium oxide composite particle comprises a plurality of tin crystal grains and a lithium oxide thin layer enveloping the tin crystal grains.

In Examples 2-1 to 2-5 listed in Table 2, other electrochemical parameters were altered while preparing the tin/lithium oxide composite thin films with potentiostatic deposition. Selected electrochemical parameters and the film thickness are listed in Table 2.

TABLE 2

| Example | Stannous Chloride (M) | Lithium Nitrate (M) | Voltage (mV) | Deposition Time (min) | Heat Treatment (° C.) | Film Thickness (nm) |
|---|---|---|---|---|---|---|
| 2-1 | $10^{-3}$ | $10^{-2}$ | 1100 | 20 | 70/200 | 300 |
| 2-2 | $10^{-3}$ | $10^{-2}$ | 1100 | 40 | 70/200 | 400 |
| 2-3 | $10^{-3}$ | $10^{-2}$ | 1100 | 80 | 70/200 | 900 |
| 2-4 | $10^{-4}$ | $10^{-3}$ | 1100 | 20 | 70/200 | 100 |
| 2-5 | $10^{-3}$ | $10^{-2}$ | 1500 | 20 | 70/200 | 50 |

It is evident from Table 2 that the alteration of a single parameter affects the film thickness of the tin/lithium oxide composite thin film thus obtained. However, results from Table 2 also validate that the tin/lithium oxide composite thin film of the embodiments of the present invention can be prepared by the methods and parameter ranges set forth in the embodiments of the present invention.

In Examples 3-1 to 3-3 listed in Table 3, pulse potential deposition was used to prepare the tin/lithium oxide composite thin film under different electrodeposition conditions. In general, the surface of the tin/lithium oxide composite thin film prepared by pulse potential deposition, in which pulse potential or pulse current is adopted, is smoother than that prepared by potentiostatic deposition, and with less stress in the pulse potential deposited film. Selected electrochemical parameters and the film thickness are listed in Table 3.

TABLE 3

| Example | Stannous Chloride (M) | Lithium Nitrate (M) | Voltage (mV) | Deposition Time (min) | Heat Treatment (° C.) | Film Thickness (nm) |
|---|---|---|---|---|---|---|
| 3-1 | $10^{-3}$ | $10^{-2}$ | 900-1100 | 20 | 70/200 | 150 |
| 3-2 | $10^{-3}$ | $10^{-2}$ | 900-1100 | 40 | 70/200 | 200 |
| 3-3 | $10^{-4}$ | $10^{-3}$ | 900-1100 | 20 | 70/200 | 50 |

Figure 4A:
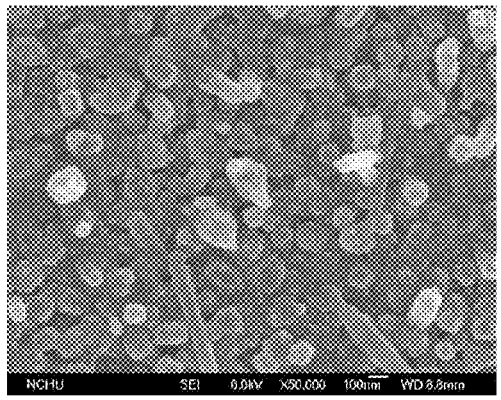
FIGS. 4A-4B are surface SEM photographs showing tin/lithium oxide composite thin films of various examples of the present invention.
Figure 4B:
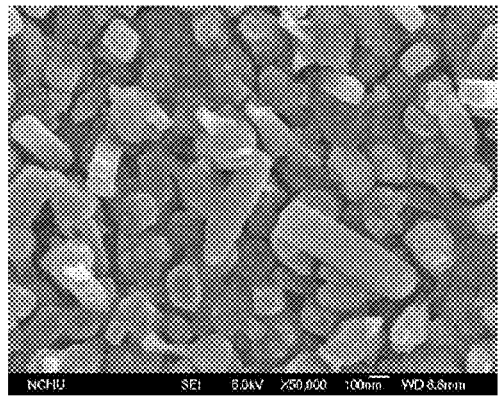

The surface structure of the tin/lithium oxide composite thin films of the Examples 3-1 to 3-3 was examined by FE-SEM (JEOL JSM-6700F form Japan). FIGS. 4A-4B are surface SEM photographs showing tin/lithium oxide composite thin films of Example 3-1 before and after a heat treatment at 200° C., respectively. The density of tin particles of Example 3-1 is higher than those of Examples 1-1 to 1-5; and the structures of tin/lithium oxide composite thin films prepared by pulse potential deposition are more uniform than those of the potentiostatic deposited ones (FIGS. 4A-4B vs FIGS. 2A-2F).

Again, from the above-mentioned working examples, it is observed that the tin/lithium oxide composite thin film of the embodiments of the present invention can be prepared by both potentiostatic deposition and pulse potential deposition.

(III) Cyclic Voltammetry Analysis of Tin/Lithium Oxide Composite Thin Films

In a further aspect, the present invention is directed to a cathode component of a secondary lithium battery with reduced irreversible capacity and improved life cycle, wherein said tin/lithium oxide composite thin films of the embodiments of the present invention is used to manufacture the cathode component.

According to one embodiment of the present invention, the cathode component of the secondary lithium battery comprises a conductive substrate and a tin/lithium oxide composite thin film, wherein said tin/lithium oxide composite thin film is disposed on a conductive surface of the conductive substrate.

In general, some irreversible reactions might have taken place during the charge-discharge cycles of the lithium battery and thus might lower the subsequent capacity or reduce the life cycle. Decomposition of liquid electrolyte is one of the irreversible reactions commonly occurs. Other irreversible reactions may include the peeling-off of the active substances on the substrate surface resulted from the active substance expansion/shrinkage in a tin-containing cathode material; and the reduction of lithium ions on the cathode surface and the reduced lithium might in turns form a solid electrolyte interface with the organic electrolyte fluid.

In the following working examples, tin/lithium oxide composite thin films of the present invention were used as the cathode material of a lithium battery. Cyclic voltammetry analysis was conducted to evaluate the capacity and charge-discharge characteristics of each battery. In the following description, Battery 2-1 refers to the lithium battery that uses the heat-treated tin/lithium oxide composite thin film of Example 2-1 as the cathode; similarly, Battery 3-3 refers to the lithium battery that uses the heat-treated tin/lithium oxide composite thin film of Example 3-3 as the cathode.

In the lithium battery of the following examples, the working electrode (cathode) was the tin/lithium oxide composite thin film; the auxiliary and reference electrode was lithium foil; and the electrolyte was a propylene carbonate (PC) solution containing 1M $LiClO_4$. The charge-discharge was carried out by constant current with a current density of about 50 $\mu A/cm2$, the open-circuit voltage (OCV) was used as a threshold voltage, and the potential window was about 0.02-1.2 V. The battery was charges-discharged for 50 cycles, and the capacity of each cycle was recorded.

The first discharge capacity (initial discharge capacity, $C_1$), the second discharge capacity ($C_2$), the irreversible capacity, the percentage of irreversible capacity, the $50^{th}$ discharge capacity ($C_{50}$) and capacity retention capability of the batteries of each example were summarized in Table 4 and Table 5, wherein:

Irreversible Capacity=$C_1-C_2$;

Percentage of Irreversible Capacity=$(C_1-C_2)/C_1\times 100\%$; and

Capacity Retention=$C_{50}/C_1\times 100\%$.

In Table 4, each Battery 2-1, Battery 2-2 and Battery 2-3 comprised a tin/lithium oxide composite thin film as the cathode, wherein the thin films were deposited by potentiostatic deposition for about 20 minutes, about 40 minutes and about 80 minutes, respectively. The Control battery used a metal tin as the cathode and the tin metal was deposited with a deposition time of about 40 minutes.

TABLE 4

|  | $C_1$ (mAh/g) | $C_2$ (mAh/g) | Irreversible Capacity (mAh/g) | Percentage of Irreversible Capacity (%) | $C_{50}$ (mAh/g) | Capacity Retention (%) |
| --- | --- | --- | --- | --- | --- | --- |
| Battery 2-1 | 1184 | 642 | 542 | 45.7 | 466 | 72.5 |
| Battery 2-2 | 1019 | 715 | 304 | 29.8 | 448 | 62.6 |
| Battery 2-3 | 980 | 745 | 235 | 23.9 | 428 | 57.4 |
| Control | 1180 | 816 | 364 | 30.8 | 357 | 43.7 |

Figure 5A:
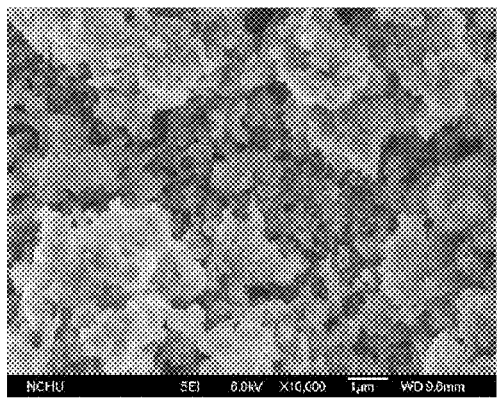
FIGS. 5A-5C are surface SEM photographs showing the cathode material of various examples of the present invention after 50 charge-discharge cycles.
Figure 5B:
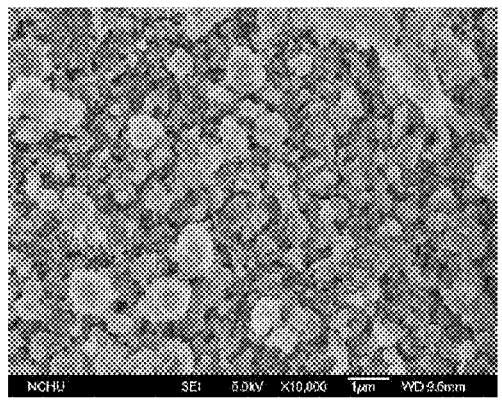

FIGS. 5A and 5B are surface SEM photographs. FIG. 5A shows the surface structure of the cathode material of the Control battery after 50 charge-discharge cycles; while FIG. 5B shows the surface structure of the cathode material of the Battery 2-2 after 50 charge-discharge cycles. By comparing FIG. 5A and FIG. 5B, it is found that the metal tin particles of the Control battery are more likely to aggregate than the tin/lithium oxide composite particle of the Battery 2-2 of the present invention.

In Table 5, each Battery 3-1 and Battery 3-2 comprised a tin/lithium oxide composite thin film as the cathode, wherein the thin films were deposited by pulse voltage deposition for about 20 minutes and about 40 minutes, respectively.

TABLE 5

|  | $C_1$ (mAh/g) | $C_2$ (mAh/g) | Irreversible Capacity (mAh/g) | Percentage of Irreversible Capacity (%) | $C_{50}$ (mAh/g) | Capacity Retention (%) |
| --- | --- | --- | --- | --- | --- | --- |
| Battery 3-1 | 1105 | 688 | 417 | 37.7 | 433 | 62.9 |
| Battery 3-2 | 1021 | 719 | 302 | 29.5 | 477 | 66.3 |

Figure 5C:
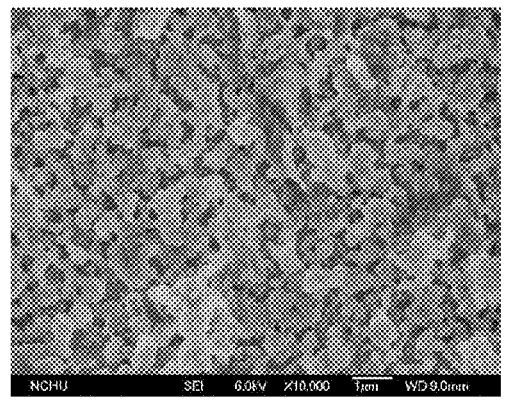

FIG. 5C is a surface SEM photographs showing the surface structure of the cathode material of Battery 3-2 after 50 charge-discharge cycles.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. An electrochemical method for manufacturing a tin metal/lithium oxide composite thin film, comprising:
    providing a solution comprising about $10^{-3}$ M to about $10^{-2}$ M lithium nitrate and about $10^{-4}$ M to about $10^{-3}$ M stannic chloride or stannous chloride;
    electrodepositing the tin metal/lithium oxide composite thin film on a conductive substrate at room temperature with a reference electrode of Ag/AgCl and a voltage of about 900-1500 mV are used; and
    drying the tin/lithium oxide composite thin film at a temperature of about 15-40° C. and a relative humidity of at least about 75%, wherein the tin metal/lithium oxide composite thin film comprises a plurality of tin/lithium oxide composite particles, and each of the tin/lithium oxide composite particles comprises a plurality of tin crystal grains and a lithium oxide thin layer enveloping the tin crystal grains.

2. The method of claim 1, wherein the electrodeposition is performed by potentiostatic deposition.

3. The method of claim 1, wherein the electrodeposition is performed by pulse potential deposition with a pulse potential of about 900-1100 mV.

4. The method of claim 1, wherein the electrodeposition is performed for a period of about 10-100 minutes.

5. The method of claim 1, wherein the drying is carried out at a temperature of about 40° C.

6. The method of claim 1, wherein the relative humidity is about 85%.

7. The method of claim 1, wherein the electrodepositing is carried out at a working temperature of about 23-27° C.

8. The method of claim 1, wherein the conductive substrate is a conductive fabric, a transparent conductive substrate, a flexible substrate, a metal substrate, or a metal oxide substrate.

9. The method of claim 8, wherein the transparent conductive substrate is a (FTO)/glass substrate, an indium tin oxide (ITO)/glass substrate, or an ITO/polyethylene naphthalate (PEN) substrate.

10. The method of claim 8, wherein the flexible substrate is a polyethylene terephthalate substrate or a polycarbonate substrate.

11. The method of claim 8, wherein the metal substrate is a platinum substrate or a stainless steel substrate.

12. The method of claim 1, further comprising heat-treating the tin metal/lithium oxide composite thin film at about 100-200° C. after drying the tin metal/lithium oxide composite thin film.

13. The method of claim 12, wherein the heat-treating step comprises a first heating stage, a second heating stage and a cooling stage, wherein
    the tin metal/lithium oxide composite thin film is heated from a temperature in a range of 23-27° C. to a temperature in a range of 70-100° C. at a first heating rate of about 2° C. per minute for about 30-180 minutes during the first heating stage;
    the tin metal/lithium oxide composite thin film is further heated to about 100-200° C. at a second heating rate of about 2° C. per minute for about 30-180 minutes during the second heating stage; and
    the tin metal/lithium oxide composite thin film is cooled to about 23-27° C. at a cooling rate of about 2° C. per minute during the cooling stage.

* * * * *